United States Patent [19]

Schluckbier et al.

[11] E Re. 29,848

[45] Reissued Nov. 28, 1978

[54] DETACHER MECHANISM FOR MILKING UNIT

[75] Inventors: Gary W. Schluckbier, Madison; Donald W. Luick, Abbotsford, both of Wis.

[73] Assignee: DEC International, Inc., Madison, Wis.

[21] Appl. No.: 778,696

[22] Filed: Mar. 17, 1977

Related U.S. Patent Documents

Reissue of:

[64] Patent No.: 3,929,103
Issued: Dec. 30, 1975
Appl. No.: 530,213
Filed: Dec. 6, 1974

[51] Int. Cl.[2] ..... A01J 5/04
[52] U.S. Cl. ..... 119/14.08
[58] Field of Search ..... 119/14.08, 14.1, 14.14

[56] References Cited

U.S. PATENT DOCUMENTS

| | | | |
|---|---|---|---|
| 3,556,053 | 1/1971 | Padman et al. | 119/14.08 |
| 3,593,687 | 7/1971 | Clegg | 119/14.1 |
| 3,603,292 | 9/1971 | Finch | 119/14.08 |
| 3,789,798 | 2/1974 | Reisgies et al. | 119/14.08 |
| 3,861,355 | 1/1975 | Johnson et al. | 119/14.08 |

FOREIGN PATENT DOCUMENTS

| | | | |
|---|---|---|---|
| 1278166 | 9/1968 | Fed. Rep. of Germany | 119/14.08 |
| 331611 | 4/1971 | Sweden. | |

*Primary Examiner*—Hugh R. Chamblee
*Attorney, Agent, or Firm*—Michael, Best & Friedrich

[57] ABSTRACT

A milking unit detacher mechanism including a main support column and a vertically movable milker support column slidably mounted on the main support column. The milker support column has a horizontally extending retractable milking unit support assembly mounted thereon adapted to support a milker unit on the end thereof when the milker unit is attached to a cow for milking. The milker unit support assembly can be retracted from its extended position underneath the cow to a retracted position adjacent the cow. A flexible retract member is fastened at one end to the milking unit support assembly and at the other end to a retract means for exerting a pulling force on the flexible retract member to thereby cause the milker unit support assembly to be retracted. The retract means includes a power cylinder having a movable piston rod. When the power cylinder is energized in its retract direction, it operates to pull on the flexible retract member and to also engage the milker support column and move it upwardly in a vertical direction.

12 Claims, 5 Drawing Figures

DETACHER MECHANISM FOR MILKING UNIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a milking unit support and detacher mechanism and more particularly to a mechanism which operates automatically upon completion of the milking cycle to cause the milking unit supported on the mechanism to be retracted from underneath the cow and also raised to a higher position.

2. Description of the Prior Art

Prior mechanisms of the general type known to applicant are shown in U.S. Pat. Nos. 3,246,631, 3,556,053, 3,603,292 and 3,690,300. In addition applicants are aware of a detacher mechanism disclosed in U.S. application Ser. No. 468,925, filed May 10, 1974, which application has been assigned to the assignee of the present application. The principal problems in the prior art mechanisms referred to above is the relative complexity of the mechanisms resulting in generally higher cost and in some instances lower reliability.

SUMMARY OF THE INVENTION

A detacher mechanism for a milking unit comprising a main support column and a vertically movable milker support column slidably mounted on the main support column. A horizontally extending retractable milking unit support assembly is mounted on the movable milker support column. The retractable support assembly is adapted to support a milker unit on the outer end thereof when the milker unit is attached to a cow for milking. The retractable support assembly is further adapted to be retracted from its extended position beneath the cow to a retracted position adjacent the cow at a predetermined point in the milking cycle. A flexible retract member is fastened at one end to the retractable milking unit support assembly and at the other end to the main support column. A retract means including a power cylinder having a movable piston is mounted on the main support column and is adapted to pull on the flexible retract member to thereby cause the support assembly to be retracted from underneath the cow. The power cylinder is also adapted when energized in its retract direction to engage the movable milker support column and move it upwardly in a vertical direction while the retractable support assembly is being retracted from underneath the cow.

DESCRIPTION OF THE PREFERRED EMBODIMENT

Figure 1:
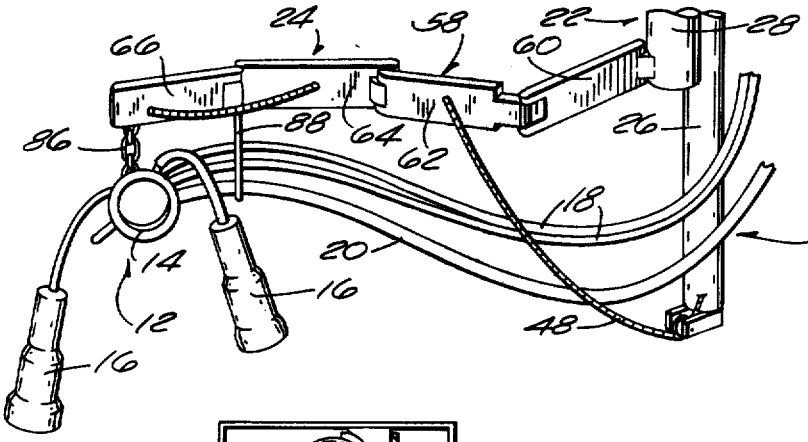
FIG. 1 is a fragmentary perspective view of a teat cup detacher mechanism made in accordance with the present invention.

Referring to FIGS. 1, 2, 3 and 4, the detacher mechanism which is indicated generally by reference numeral 10 is adapted to be used with a milking apparatus 12 of any suitable design. The milking apparatus 12 shown in FIG. 1 is comprised of a claw unit 14, a plurality of teat cups 16, vacuum lines 18 and a milk line 20.

The detacher mechanism 10 is comprised of two basic sub-assemblies, namely, a vertical column assembly 22 and a horizontally extending retractable milker unit support assembly 24 mounted at the lower end of column assembly 22.

Vertical column 22 is comprised of a stationary main support column 26 and a vertically adjustable milker support column 28 mounted on column 26. Main support column 26 is mounted adjacent a milking stall by any suitable support structure (not shown) and adjustable column 28 is supported from above on a pulley 30 rotatably mounted on the upper end of support column 26. Column 28 is supported on pulley 30 by a cable 32 and a counterweight 34. The vertical movement of column 28 is guided by a pair of guide brackets 36 and 38.

Figure 2:
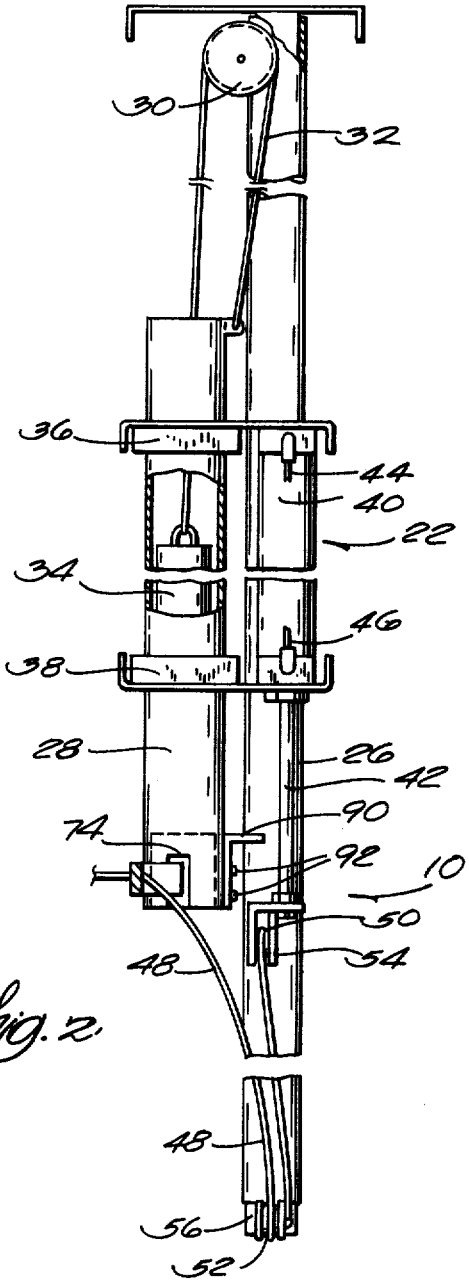
FIG. 2 is a front elevation view (with parts broken away) of the detacher mechanism.

As best shown in FIG. 2, one end of cable 32 is attached to the upper end of column member 28 and the cable is wound around pulley 30 with the other end of the cable being attached to counterweight 34 which in turn is mounted for reciprocal movement inside column 28.

The detacher mechanism is powered by a power cylinder 40 (preferably pneumatic) mounted on main support column 26 by mens of upper and lower bracket members 36 and 38. Cylinder 40 is of a double-acting type having an internal piston (not shown) attached to a piston rod 42 and a pair of air hoses 44 and 46 connected to opposite ends thereof as shown in FIG. 2. Cylinder 40 is operatively connected to retractable unit support assembly 24 by a flexible retract member 48 which in the preferred embodiment is in the form of a ball chain. Chain 48 is wound over pulleys 50 and 52. Pulley 50 is mounted on the end of piston rod 42 by a bracket 54 and pulley 52 is mounted on the lower end of column 26 by a bracket 56. Chain 48 is fastened at one end to bracket 56 and from there it extends upwardly to pulley 50 and then around pulley 50 downwardly to pulley 52 and then around pulley 52 upwardly to retractable milker unit support assembly 24.

Figure 4:
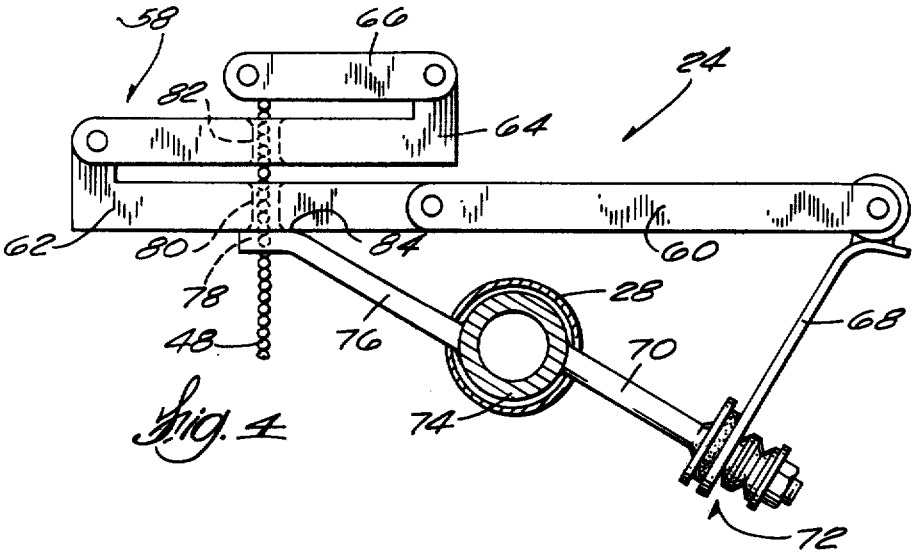
FIG. 4 is a sectional view taken along line 4—4 of FIG. 3.

As best shown in FIGS. 1 and 4, assembly 24 includes a retractable link assembly 58 comprised of a plurality of pivotally connected link members 60, 62, 64 and 66. The four link members 60, 62, 64 and 66 are pivotally connected to each other in end-to-end relationship by suitable pivot pins as shown.

As shown in FIG. 4, the first link member 60 is pivotally mounted on a bracket member 68 which in turn is fastened to a second bracket 70 by a bolt, nut, friction plate and spring washer assembly 72. Bracket 70 is welded to short, tubular member 74 which in turn is fastened inside the lower end of column 28 by any suitable means such as a plurality of machine screws (not shown). A combination ball chain guide bracket and stop member 76 is also welded to tube 74.

The friction assembly 72 connecting bracket 68 to bracket 70 serves as a friction clutch to permit relative rotation of the two brackets when a shock force is applied to the retractable link assembly 58. Thus should such a force be applied by a kick from a cow, for example, force will be absorbed by assembly 72 (causing bracket 68 to be rotated) to thereby prevent damage to the mechanism which might otherwise occur. In such event the retractable link assembly 58 can be readily restored to its proper horizontally extending position by simply gripping the link assembly and firmly rotating it back to its proper horizontal position.

The retract chain member 48 extending from pulley 52 is threaded through an opening 78 in bracket 76 and from there it is threaded through an opening 80 in link 62, then through another opening 82 in link 64 and then fastened to the end link 66. As best shown in FIG. 4, when retractable link assembly 58 is in its fully retracted position, link 62 thereof will abut the face 84 of bracket 76 which serves as a stop member for the retractable link assembly.

A flexible support 86 in the form of a short length of chain is fastened to the end of link 66 from which milker unit 12 is supported as shown in FIG. 1. A depending hook member 88 is mounted at the pivot point between links 64 and 66 which serves to support the vacuum and milk lines 18 and 20 as best shown in FIG. 1.

A catch bar member 90 is bolted to the lower end of column 28 by machine screws 92. The catch bar cooperates with the bracket 54 fastened to the end of piston rod 42 in the retract operation as will be more fully described hereinafter.

Figure 5:
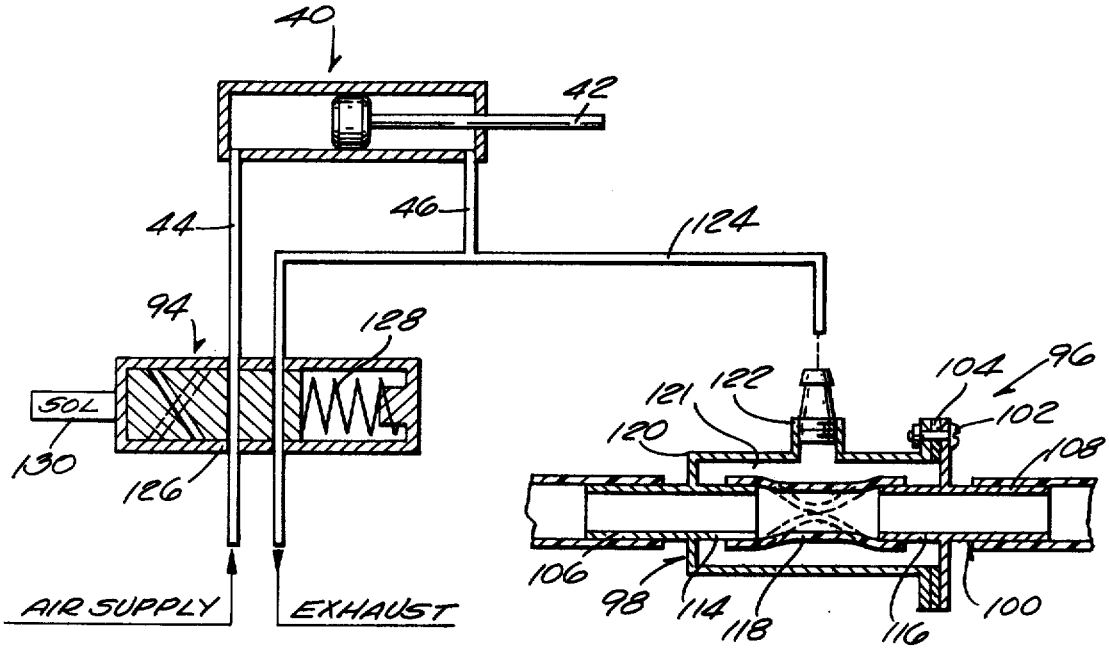
FIG. 5 is a partially schematic view of the central means for the detacher mechanism.

As shown in FIG. 5, the detacher mechanism of the present invention is controlled by a four-way solenoid valve 94 and a unique milk valve unit 96. FIG. 5 shows the four-way solenoid valve in its deenergized position and the milk valve in its open position.

Milk valve 96 is comprised of fittings 98 and 100 attached to each other in sealing arrangement by bolts 102 and a gasket 104. Fittings 98 and 100 have externally extending tubular portions 106 and 108 for attachment to milk conduits 110 and 112. Fittings 98 and 100 also are provided with internally extending tubular extensions 114 and 116 which are adapted for connection to an internal hose member 118 of flexible material such as rubber. Fitting 98 is provided with a jacket portion 120 which surrounds the internal rubber hose member 118 to thereby provide a pressurized chamber 121 around such rubber hose portion. The jacket is provided with a nipple 122 for connection to an air hose 124 as will be described in detail hereinafter. It will be appreciated that when a sufficient pressure differential is created between the inside of rubber hose element 118 and the chamber 121 around the hose, the hose will collapse to the position shown in dotted lines to thereby shut off flow between the inlet and outlet of the milk valve 96.

Solenoid valve 94 is shown schematically in FIG. 5 and is comprised of a reciprocating valve element 126, a return spring 128 and solenoid activating coil 130.

OPERATION

To initiate the milking cycle solenoid valve 94 is deenergized wherein it will assume the position shown in FIG. 5. In such condition the top of the cylinder 40 will be pressurized causing piston rod 42 to move downwardly to the position shown in FIGS. 2 and 3. At the same time the lower end of cylinder 40 and the chamber 121 of milk valve 96 will be connected to exhaust. This will allow the milk valve to assume its open position due to the inherent resiliency of tube member 118. With the milk valve in its open position vacuum to the milker unit will be supplied through the milk valve. The milker and detacher apparatus is now in condition for use.

With the retractable support assembly 24 in retracted position (FIG. 4) the assembly is moved to extended position (FIG. 1) manually by the operator. At the same time the operator adjusts the vertical position of assembly 24 by manually raising or lowering column 28 to the proper height for the cow to be milked. It will be appreciated that such vertical adjustment will cause a movement of counterweight 34 and that such counterweight will keep the column 28 at the desired elevation once it is set. The operator adjusts the vertical position of assembly 24 to a position wherein the milker unit is completely free floating with respect to the cow's udder. The flexible support member 86 permits a limited amount of relative movement between the cow and the milker unit without disturbing the free floating relationship.

The operator then attaches the teat cups and milking commences and the operator leaves. Milking continues until the milk flow from the milker unit 12 drops below a predetermined minimum amount (preferably one-half pount per minute) at which time a milk flow sensor of any suitable design (not shown) will operate to energize solenoid valve 94 as shown in FIG. 5.

Actuation of solenoid valve 94 will cause valve member 126 to move to the right which in turn will cause air under pressure to be directed to the bottom of power cylinder 40 through air hose 46 which in turn will cause the piston cylinder and rod 42 thereof to be raised. Simultaneously air under pressure will be directed to chamber 121 of milk valve 96 through air line 124 which in turn will cause the milk valve to close. The closing of the milk valve 96 will turn off the vacuum to the milker unit 12 to thereby facilitate release of the teat cups 16 from the cow.

Initial upward movement of piston rod 42 will produce a retracting movement of ball chain 48 which in turn will cause the milker unit support assembly (and milker unit 12 supported therefrom) to start its retracting movement from the position shown in FIG. 1 to the position shown in FIG. 4. In addition, upward movement of the piston rod will cause bracket 54 attached to the end of the piston rod to engage catch bar 90 attached to the end of column 28 which in turn will cause the column to be moved upwardly along with the piston rod.

It will be apparent from the foregoing that in the automatic detaching operation described above the milker unit 12 is first automatically released from the cow due to the shut off of vacuum. Immediately, thereafter the milker unit is retracted from underneath the cow by the actuation of the retractable support assembly 24 by ball chain 48. Immediately after such retracting operation begins the assembly 24 and milker unit will be raised to a predetermined vertical position by the engagement of bracket 54 with catch bar 90. Such raising of the milker unit during its retraction from underneath the cow will tend to prevent the detached teat cups from falling down onto the ground area at the stall.

Figure 3:
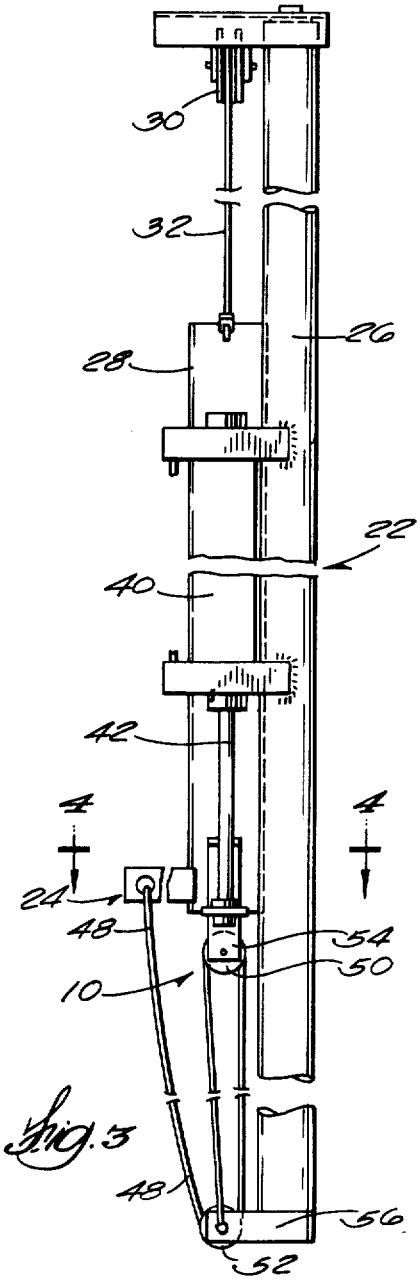
FIG. 3 is a side elevation view of the detacher mechanism.

After the detacher mechanism has been operated as described above, the solenoid valve 94 is again deenergized by the operator to cause air under pressure to be directed through air hose 44 to the upper end of cylinder 40 to thereby return the piston (and piston rod) to the position shown in FIGS. 2 and 3. The deenergization of solenoid will also connect the sealed chamber 121 of milk valve 96 to exhaust thereby causing the milk valve to open. The mechanism is now ready for beginning the milking cycle again.

I claim:

[1. A milking unit support and detacher mechanism comprising:

a main support column;

a vertically movable milker support column slidably mounted on said main support column;

a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;

a flexible retract member fastened at one end to said retractable milking unit support assembly; and retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction.]

[2. A milking unit according to claim 1 in which said horizontally extending retractable milking unit support assembly is comprised of a plurality of horizontally extending link members pivotally connected together in end-to-end relationship with said flexible retract member fastened to said one end to the end link member and threaded back through openings in at least two of the other link members so that when said flexible retract member is actuated by said power cylinder, said link members will fold up on themselves to thereby cause said retractable milking unit support assembly to be retracted from underneath the cow.]

[3. A milking unit according to claim 1 in which said retract means further includes first and second pulleys, said first pulley mounted at the lower end of said main support column and said second pulley mounted on the end of the piston rod of said power cylinder, with said flexible retract member extending from said retractable milking unit support assembly downwardly and around said first pulley and then upwardly and around said second pulley.]

[4. A milking unit according to claim 1 in which said retract means further includes a counterweight assembly for said milker support column, said counterweight assembly adapted to support said milker support column in a substantially stable, vertical position so that it can be moved vertically either up or down with only a small amount of force applied to it.]

[5. A milking unit according to claim 4 in which said counterweight assembly is comprised of a cable fastened at one end to the upper end of said milker unit support column and at the other end to a counterweight member, said counterweight member mounted for slidable movement inside the upper portion of said milker support column, said counterweight assembly further including a pulley member mounted on the top portion of said main support column over which said cable member is wound.]

[6. A milking unit support and detacher mechanism comprising:

a main support column;

a vertically movable milker support column slidably mounted on said main support column;

a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;

a flexible retract member fastened at one end to said retractable milking unit support assembly;

retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction; and control means for automatically initiating the actuation of said power cylinder at a predetermined point in the milking cycle.]

[7. A milking unit according to claim 6 in which said control means includes a control valve means and a milk valve means, said control valve means adapted to control the operation of said power cylinder and said milk valve means wherein when said power cylinder is energized for movement in the retract direction, the milk valve means will close to shut off flow of milk from the milker unit attached to the cow.]

[8. A milking unit according to claim 7 in which said control valve means is further adapted when said power cylinder is energized in its return direction to open said milk valve means.]

[9. A milking unit according to claim 8 in which said milk valve means includes an inlet and an outlet adapted for connection to a milk line and a tubular valve member of flexible material through which milk flows from said inlet to said outlet when said tubular valve member is in its normal unflexed position, said milk valve means further including a pressurizing means for pressurizing the exterior surface of said tubular valve member to thereby cause said valve member to be flexed inwardly to cut off flow of milk therethrough.]

10. A milking unit according to claim [9] *17* in which said pressurizing means includes a sealed chamber in which said tubular valve member is mounted and a source of air under pressure connected to said sealed chamber.

11. A milking unit according to claim 10 in which said control valve means is operative to connect said source of air under pressure with said sealed chamber of said milk valve means when said power cylinder is energized in its retract direction.

[12. A milking unit according to claim 6 in which said retract means further includes first and second pulleys, said first pulley mounted at the lower end of said main support column and said second pulley mounted on the end of the piston rod of said power cylinder, with said flexible retract member fastened at its other end to said main support column and then extracted upwardly and around said second pulley and then downwardly from said second pulley and around said first pulley and then upwardly from said first pulley for connection to said horizontally extending retractable milking unit support assembly.]

[13. A milking unit according to claim 6 in which said retract means further includes a counterweight assembly for said milker support column, said counterweight assembly adapted to support said milker support column in a substantially stable vertical position so that it can be moved vertically either up or down with only a small amount of force applied to it.]

[14. A milking unit according to claim 13 in which said counterweight assembly is comprised of a cable fastened at one end to the upper end of said milker unit support column and at the other end to a counterweight member, said counterweight member mounted for slidable movement inside the upper portion of said milker support column, said counterweight assembly further including a pulley member rotatably mounted on the top portion of said main support column over which said cable member is wound.]

*15. A milking unit support and detacher mechanism comprising:*

*a main support column;*

*a vertically movable milker support column slidably mounted on said main support column;*

*a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened at one end to said retractable milking unit support assembly; and*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction, said retract means further including first and second pulleys, said first pulley mounted at the lower end of said main support column and said second pulley mounted on the end of the piston rod of said power cylinder, with said flexible retract member extending from said retractable milking unit support assembly downwardly and around said first pulley and then upwardly and around said second pulley and then anchored.*

*16. A milking unit support and detacher mechanism comprising:*

*a main support column;*

*a vertically movable milker support column slidably mounted on said main support column;*

*a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened to one end to said retractable milking unit support assembly;*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction; and control means for automatically initiating the actuation of said power cylinder at a predetermined point in the milking cycle, said control means further including a control valve means and a milk valve means, said control valve means adapted to control the operation of said power cylinder and said milk valve means wherein when said power cylinder is energized for movement in the retract direction, the milk valve means will close to shut off flow of milk from the milker unit attached to the cow, said control valve means further adapted when said power cylinder is energized in its return direction to open said milk valve means.*

*17. A milking unit support and detacher mechanism comprising:*

*a main support column;*

*a vertically movable milker support column slidably mounted on said main support column;*

*a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened at one end to said retractable milking unit support assembly;*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction; and control means for automatically initiating the actuation of said power cylinder at a predetermined point in the milking cycle, said control means further including a control valve means and a milk valve means, said control valve means adapted to control the operation of said power cylinder and said milk valve means*

*wherein when said power cylinder is energized for movement in the retract direction, the milk valve means will close to shut off flow of milk from the milker unit attached to the cow, said control valve means further adapted when said power cylinder is energized in its return direction to open said milk valve means, said milk valve means further including an inlet and an outlet adapted for connection to a milk line and a tubular valve member of flexible material through which milk flows from said inlet to said outlet when said tubular valve member is in its normal unflexed position.*

*18. A milking unit support and detacher mechanism comprising:*

*a main support column;*

*a vertically movable milker support column slidably mounted on said main support column;*

*a horizontally extending retractable milking unit support assembly mounted on said milker support column, said retractable milker unt support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened to one end to said retractable milking unit support assembly;*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction, said retract means further including first and second pulleys, said first pulley mounted at the lower end of said main support column and said second pulley mounted on the end of the piston rod of said power cylinder, with said flexible retract member fastened at its other end to said main support column and then extended upwardly and around said second pulley and then downwardly from said second pulley and around said first pulley and then upwardly from said first pulley for connection to said horizontally extending retractable milking unit support assembly; and*

*control means for automatically initiating the actuation of said power cylinder at a predetermined point in the milking cycle.*

*19. A milking unit support and detacher mechanism comprising:*

*a main support column;*

*a vertically movable milker support column slidably mounted on said main support column;*

*a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened at one end to said retractable milking unit support assembly;*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction, said retract means further including a counterweight assembly for said milker support column, said counterweight assembly adapted to support said milker support column in a substantially stable, vertical position so that it can be moved vertically either up or down with only a small amount of force applied to it.*

*20. A milking unit according to claim 19 in which said counterweight assembly is comprised of a cable fastened at one end to the upper end of said milker unit support column and at the other end to a counterweight member, said counterweight member mounted for slidable movement inside the housing for said milker unit support column, said counterweight assembly further including a pulley member rotatable mounted on the top portion of main support column over which said cable member is wound.*

*21. A milking unit support and detacher mechanism comprising:*

*a main support column;*

*a vertically movable milker support column slidably mounted on said main support colunn;*

*a horizontally extending retractable milking unit support assembly mounted on said milker support column, said retractable milker unit support assembly adapted to support a milker unit on the outer end thereof when the milker unit is attached to a cow for milking, said milker unit support assembly further adapted to be retracted from its extended position underneath the cow to a retracted position adjacent the cow;*

*a flexible retract member fastened at one end to said retractable milking unit support assembly; and*

*retract means for pulling on said flexible retract member to cause said milker unit support assembly to be moved from its extended position to its retracted position, said retract means including a power cylinder having a movable piston rod mounted on said main support column, said power cylinder being operatively connected to said flexible retract member and to said milker support column, said power cylinder adapted when energized in its retract direction to pull on said flexible retract member and to also move said milker support column upwardly in a vertical direction, said retract means further including a pair of pulleys, one of said pulleys mounted at the lower end of said main support column and the other of said pulleys mounted on the end of the piston rod of said power cylinder, with said flexible retract member fastened at its other end to one of said pulleys and extending therefrom to the other of said pulleys and around said other pulley and back to the pulley at which the retract member is fastened and then around said pulley to said retractable milking unit support assembly, said retract means further including a counterweight assembly for said milker support column, said counterweight assembly adapted to support said milker support column*

*in a substantially stable, vertical position so that it can be moved vertically either up or down with only a small amount of force applied to it.*

*22. A milking unit according to claim 21 in which said control means includes a control valve means and a milk valve means, said control valve means adapted to control the operation of said power cylinder and said milk valve means wherein when said power cylinder is energized for movement in the retract direction, the milk valve means will close to shut off flow of milk from the milker unit attached to the cow.*

*23. A milking unit according to claim 22 in which said control valve means is further adapted when said power cylinder is energized in its return direction to open said milk valve means.*

*24. A milking unit according to claim 23 in which said milk valve means includes an inlet and an outlet adapted for connection to a milk line and a tubular valve member of flexible material through which milk flows from said inlet to said outlet when said tubular valve member is in its normal unflexed position, said milk valve means further including a pressurizing means for pressurizing the exterior surface of said tubular valve member to thereby cause said valve member to be flexed inwardly to cut off flow of milk therethrough.*

* * * * *

UNITED STATES PATENT OFFICE

CERTIFICATE OF CORRECTION

Patent No. Re. 29,848 Dated November 28, 1978

Inventor(s) Gary W. Schluckbier and Donald W. Luick

It is certified that error appears in the above-identified patent and that said Letters Patent are hereby corrected as shown below:

In Claim 10, line 1 delete "17" and insert -- 24 --.

Signed and Sealed this

*Twenty-fourth* Day of *April 1979*

[SEAL]

*Attest:*

RUTH C. MASON
*Attesting Officer*

DONALD W. BANNER
*Commissioner of Patents and Trademarks*